June 11, 1963 G. J. TATNALL ET AL 3,093,808
AIR-DROPPED MINIATURE SONOBUOY
Filed Feb. 29, 1960 3 Sheets-Sheet 1
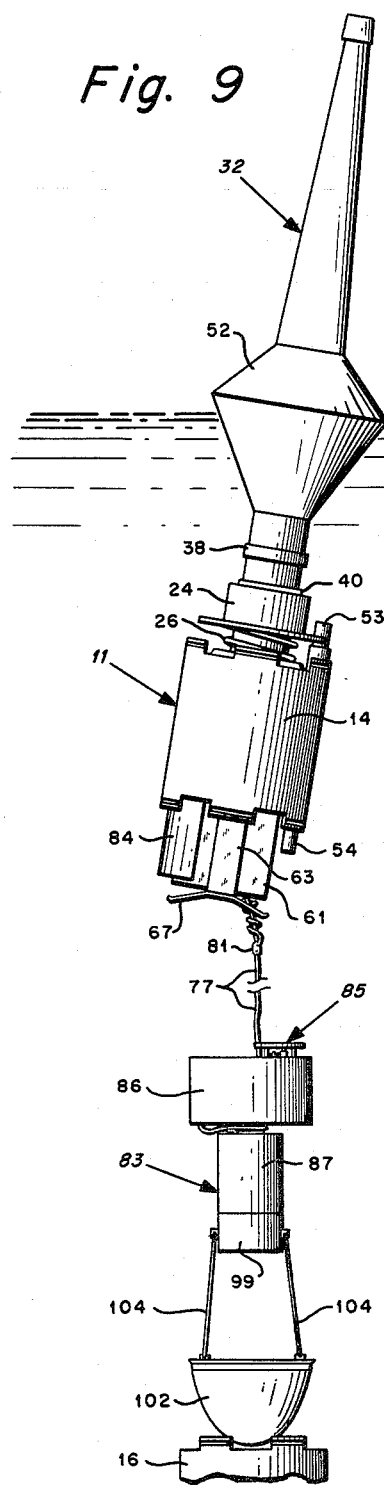
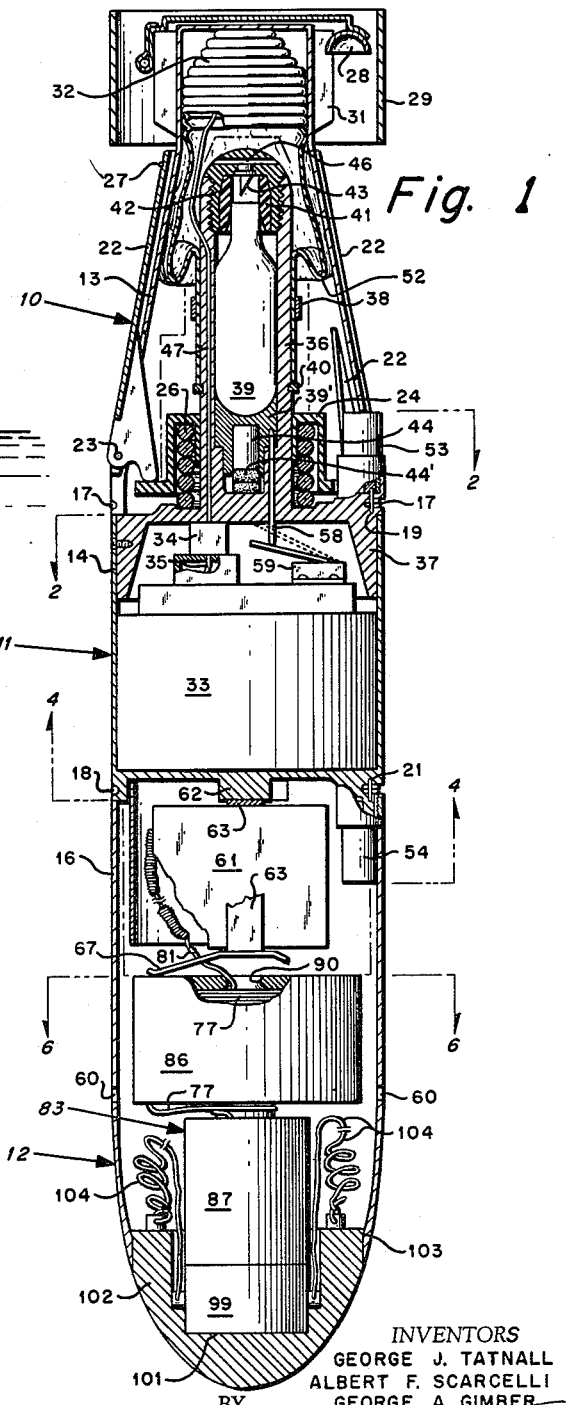
INVENTORS
GEORGE J. TATNALL
ALBERT F. SCARCELLI
BY GEORGE A. GIMBER
AGENT June 11, 1963 G. J. TATNALL ET AL 3,093,808
AIR-DROPPED MINIATURE SONOBUOY
Filed Feb. 29, 1960 3 Sheets-Sheet 2

INVENTORS
GEORGE J. TATNALL
ALBERT F. SCARCELLI
BY GEORGE A. GIMBER

AGENT

INVENTORS
GEORGE J. TATNALL
ALBERT F. SCARCELLI
BY  GEORGE A. GIMBER

AGENT

United States Patent Office 3,093,808
Patented June 11, 1963

3,093,808
AIR-DROPPED MINIATURE SONOBUOY
George J. Tatnall, Southampton, and Albert F. Scarcelli and George A. Gimber, Hatboro, Pa., assignors to the United States of America as represented by the Secretary of the Navy
Filed Feb. 29, 1960, Ser. No. 11,939
9 Claims. (Cl. 340—2)
(Granted under Title 35, U.S. Code (1952), sec. 266)

The invention herein may be manufactured and used by or for the Government of the United States of America for governmental purposes without the payment of any royalties thereon or therefor.

The present invention relates to acousto-electric transponders, and more particularly to an air-dropped miniature sonobuoy capable of being automatically conditioned for transmitting radio signals modulated by acoustical signals received under water.

Sonobuoys of the character known in the prior art have been used primarily in searches for underwater objects such as submarines and in oceanographic surveys of currents, depths, salinity, temperature, radiation, etc. Due to inherent acoustical range limitations present in the use of sonobuoys, it is often necessary to disperse numerous sonobuoys over a large area of interest in order to make a complete and inclusive search for underwater objects. Similarly, an oceanographic survey of a large area of an ocean would also require dispersion of a large number of sonobuoys to assure reliability of observed data.

Where the search or survey is being carried out from an aircraft utilizing air-dropped sonobuoys, the extent of the search or survey has been limited largely by the endurance capabilities of the aircraft under a given payload. For example, if the duration of flight of the aircraft is limited to eight hours with a given number of sonobuoys onboard, and the time required to fly to and from the area of interest is four hours, the time remaining for search or survey, known as "on-station-time," is four hours. Hence, a lighter and more compact sonobuoy will permit the payload to be decreased without any reduction in the number of sonobuoys carried by the aircraft. Likewise, more sonobuoys of this type can be carried for a given payload. Under either loading condition, the search capabilities of the aircraft are thus extended.

Those concerned with the development of air-dropped sonobuoys have recognized the need for a compact and lightweight sonobuoy. Heretofore, the smallest known sonobuoy regarded as being of any significant importance for aircraft use was approximately 36 inches long, 5 inches diameter and weighed 16 to 20 pounds. The means for conditioning such a sonobuoy for operation in the sea consisted of complex timing mechanisms initiated in response to impact with the water or in response to water pressure. Buoyancy of the sonobuoy depended upon air cavities in the main body of the sonobuoy. Furthermore, the hydrophone listening depth was limited to only about 50 feet. These and other known methods and apparatus were not readily adapted to miniaturization, and entirely new approaches in component structure were required.

The general purpose of this invention is to fulfill this requirement by providing a miniature air-dropped sonobuoy which embraces all the advantages of the similarly employed larger sonobuoys and which possesses none of the aforementioned disadvantages. To attain this, several novel concepts in sonobuoy operation and structure therefore have been utilized. It the specific embodiment disclosed hereinbelow, the use of these concepts permitted design and construction of a miniature sonobuoy 15 inches long, 3 inches in diameter and weighing only 5 pounds. The cable length can also be selected for any desired listening depth down to 300 feet.

Accordingly, it is an object of the present invention to provide an improved miniature sonobuoy which is particularly adapted to be dispensed from an aircraft into the water and automatically conditioned by squib actuations for detecting underwater sounds and transmitting a radio signal indicative of said sounds.

Another object of the invention is directed to providing an improved cartridge-inflated balloon adapted to erect automatically a radio antenna in a sonobuoy.

A further object of the invention is to provide a unique arrangement of a hydrophone and hydrophone amplifier in a single sonobuoy detecting head.

Yet another object of the invention is directed to providing a novel means for quickly preselecting a desired hydrophone listening depth.

A still further object of the invention is to provide an improved means for puncturing a gas cartridge located in a projectile subject to large impact forces.

These and other objects and many of the attendant advantages of the present invention will be readily appreciated as the same become better understood by reference to the following detailed description when considered in connection with the accompanying drawings, where:

FIG. 1 represents a longitudinal section of a complete assembly of an air-dropped miniature sonobuoy prior to being dispensed from an aircraft;

FIG. 9 is a pictorial illustration in elevation of the sonobuoy shown in FIG. 1 in the operative condition for detecting underwater sounds and transmitting a radio signal indicative of said sounds.

Figure 2:
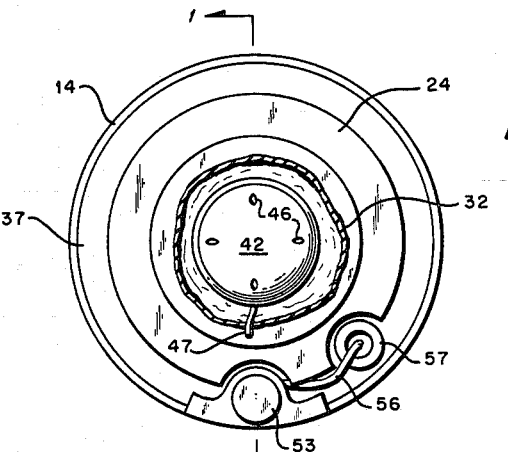
FIG. 2 represents a rear view of the sonobuoy with the speed retarding assembly of the sonobuoy removed at lines 2—2 of FIG. 1.
Figure 4:
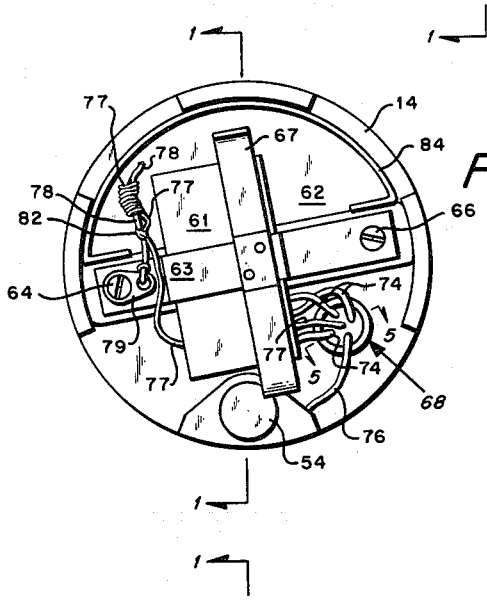
FIG. 4 represents a front view of the sonobuoy with the nose cone assembly of the sonobuoy removed at lines 4—4 of FIG. 1.
Figure 6:
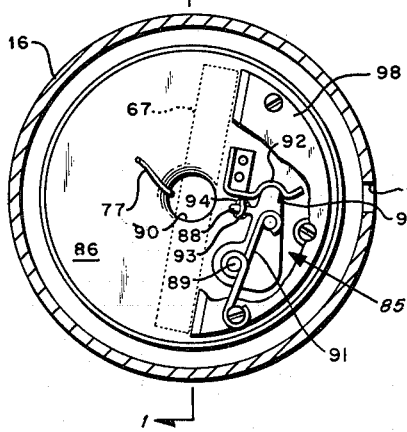
FIG. 6 represents in cross section a rear view of the nose cone assembly taken on lines 6—6 of FIG. 1.
Figure 7:
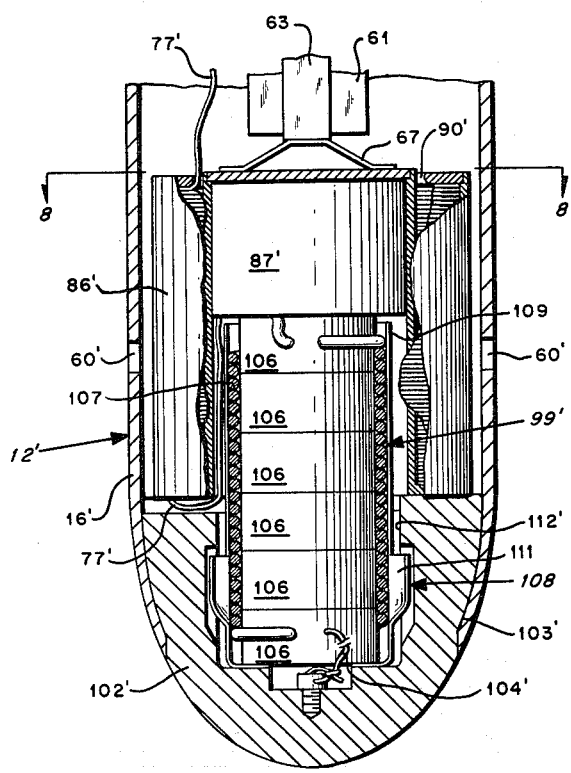
FIG. 7 illustrates an alternative embodiment of the nose cone assembly utilizing a line-type hydrophone.

The orientation of FIGS. 2, 4 and 6 with respect to the longitudinal cross-section view in FIG. 1 may be aided by reference to the line 1—1 in each of FIGS. 2, 4 and 6 upon which the cross-sectional view is taken. Similarly, the cross-sectional view in FIG. 7 is taken along the line 7—7 in FIG. 8.

Referring now to the drawings, wherein like reference characters designate like or corresponding parts throughout the several views, there is illustrated in FIG. 1 a complete miniature sonobuoy assembled for mounting in the dispenser of an aircraft or other vehicle adapted for carrying sonobuoys to a water area of interest and dispensing them from a substantial elevation above the surface of the water. The sonobuoy is constructed in a ballistic configuration and comprises three main sections which are denoted as a tail assembly 10, a main body 11, and a nose assembly 12. The tail assembly 10 has a substantially frusto-conical casing 13 as the primary means of support. Generally, cylindrical casings 14 and 16, constitute support and closure members, respectively, for the main body 11 and the nose assembly 12. The confronting ends of the casings 13 and 14 are defined by intermeshing teeth circumferentially arranged around the casings and form a continuous circumferential groove when the casings 13 and 14 are connected to each other. A hoop spring 17 retains the connection. Similarly, a hoop spring 18 retains an intermeshing teeth connection between confronting ends of casings 14 and 16. A more complete description of the operation of the hoop spring operation is disclosed in U.S. Patent No. 3,047,259 of George J. Tatnall and Albert F. Scarcelli for Speed Brake Retarding Mechanism for an Air-Dropped Store, issued July 31, 1962. The hoop springs 17 and 18 are held in the retaining positions illustrated in FIG. 1 by squib-actuated arming pins 19 and 21, respectively.

The tail cone assembly 10 of the sonobuoy is primarily used to guide the sonobuoy through a predictable trajectory with minimum acceleration load factors. This is accomplished by an aerodynamic speed retarding mechanism of the type disclosed in the U.S. Patent No. 3,047,259. Briefly, a plurality of circumferentially disposed blades 22 pivotally spread outward about pivots 23 as urged by actuating plate 24 and spring 26. The blades 22 are held in a retracted position by a noose 27 which, in turn, is connected to an air impact pressure responsive paddle 28. A circular stabilizer duct 29 is concentrically supported around casing 13 by radial fins 31. The rear portion of the casing 13 is substantially cylindrical and closed at the rear extremity for storing a deflated flotation balloon 32 folded in the manner illustrated in FIG. 1. Having served its function of dispatching the sonobuoy into the water, the tail assembly 10 is jettisoned from the main body 11 thereby exposing the balloon 32.

The main body 11 of the sonobuoy performs the function of receiving electric signals of audio frequency and transmitting discrete radio signals indicative of the electric signals. This is acocmplished by an electronic network 33 fixed in the casing 14 and which includes a modulator for producing a radio frequency signal in accordance with the audio frequency input signal. The radio frequency output of the network 33 is connected to an antenna connector 34 through a circuit 35. A cylindrical cartridge housing 36 forms a part of a bulkhead 37 and extends rearwardly of the main body 11 for retaining the balloon 32. The neck of the balloon 32 is cemented to the outside surface of the cartridge housing 36 and is further secured thereto by a hose clamp 38. A ring 40, seated in a groove around the housing 36, limits the rearward travel of plate 24 when the tail assembly 10 is jettisoned. A pressurized gas cartridge 39 is slideably engaged within the housing 36 and is urged against a firing plunger 39' by a resilient shock absorber 41 and a housing cap 42 threaded in housing 36. The cartridge 39 has a sealed opening in a neck formed at one end. The opening is directed toward a sharp prong 43 fixed to the cap 42 and axially disposed to the cartridge housing 36. The prong 43 pierces the sealed opening to permit pressurized gas contained in the cartridge 39 to escape. An electrically ignitable squib 44 is disposed in a recess of the plunger 39' for opposing the force exerted by the shock absorber 41. The squib 44 includes a fuse 44' for imposing a small time delay between electric energization and ignition of the main explosive charge in the squib 44.

Figure 3:
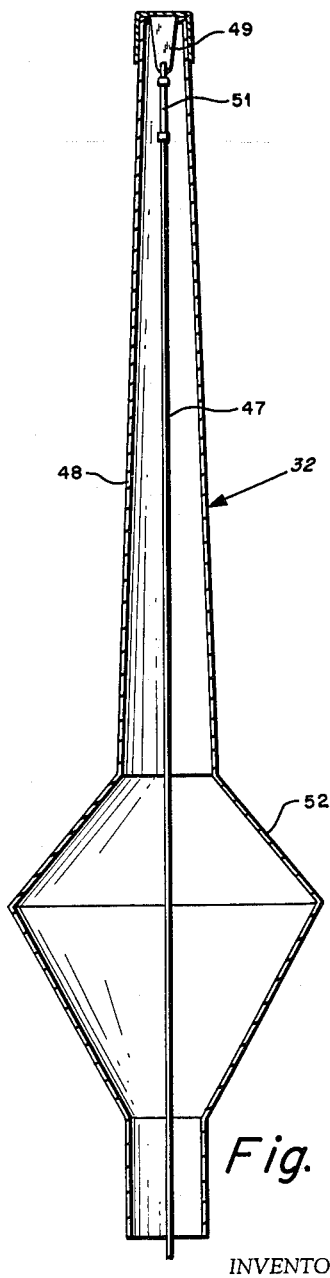
FIG. 3 represents in cross section the balloon-erected radio antenna of the sonobuoy shown in FIG. 1 in the operative position.

As best seen by FIG. 1 taken with FIG. 2, the housing cap 42 is further defined by a plurality of orifices 46 through which the pressurized gas in the cartridge 39 communicates with the space enclosed by the balloon 32 when the sealed opening is pierced by the prong 43. An insulated and shielded portion of an antenna 47 conducts the transmitter 33 output signal from the connector 34 through the cartridge housing 36 to the balloon 32. The shielding is terminated and grounded by means, not shown, at the housing cap 42, and the inner conductor continues into the balloon 32. As shown in FIG. 3, when the balloon 32 is inflated, a conical section 48 is erected and the antenna 47 is drawn taut, thereby. A flexible tab 49 fixed to the upper extremity of the balloon 32 connects to the antenna 47 through an elastic element 51. An enlarged section 52 provides the necessary air space to cause the sonobuoy to float, the conical section 48 remaining above the surface of the water.

Squib-actuated devices for removing arming pins 19 and 21 and designated by the numerals 53 and 54, respectively, structurally form a part of the main body 11. As seen in FIG. 2, electrical energy is provided to the squib device 53 by means of a conductor 56 passing through a gland 57. An actuator pin 58 is fixed to the plunger 39' and slideably extends through the bulkhead 37 and contacts a switch 59. By means, not illustrated, the snap-acting switch 59 selectively connects the squib 44 and squib devices 53 and 54 to a sea-activated battery 61. Hence, when the plunger 39' is forced upward by the explosion of squib 44, all of the squib circuits are disconnected from the battery 61 to insure against a possible continuing current drain on the battery 61, which, as mentioned above, is of the type activated when immersed in sea water. Initial access of sea water to the battery 61 is via holes 60 in the casing 16.

Figure 5:
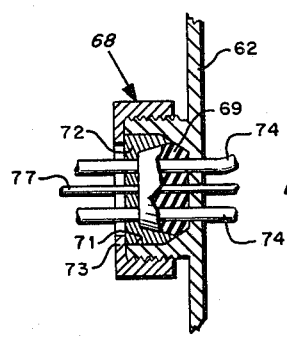
FIG. 5 represents in cross section a gland taken on the line 5—5 of FIG. 4.

As best seen in FIG. 1 taken with FIG. 4, the battery 61 is secured on a raised portion of a bulkhead 62 by a support bracket 63 held on the bulkhead 62 by screws 64 and 66. A leaf spring 67 is connected intermediate of its ends to the bracket 63 for urging components contained in the nose assembly 12 forward when the casing 16 is secured to the casing 14 by hoop spring 18. Electrical connections to the network 33, squib 44 and devices 53 and 54 from the various elements external to the enclosed casing 14 are obtained through a gland 68. The gland 68 is illustrated in cross-section in FIG. 5 as having a packing 69 compressed in recess 71 by a fitting 72 and a nut 73. It is contemplated that the gland 57 be similarly constructed. Conductors 74 provide selected voltages from battery 61 to the squib 44, devices 53 and 54 and to a power supply in the network 33. A conductor 76 delivers electrical energy to the device 54 and a double-conductor hydrophone cable 77 concomitantly delivers a direct voltage to the nose assembly 12 and receives an audio frequency signal from the nose assembly 12. The hydrophone cable 77 is rendered compliant as to its effective length by means of a flexible length of elastic 78 connected at one end to the bulkhead 62 by means of a lug 79. The elastic 78 passes through a pre-coiled portion of the hydrophone cable 77 and is then connected at its other end to the hydrophone cable 77 by a clip 81. The elastic 78 is also attached to the hydrophone cable 77 near lug 79 by another clip 82. By this arrangement, the effective length of the hydrophone cable 77 can vary with sudden wave motions in the water without altering the desired depth at which a detecting head 83 connected to the hydrophone cable 77 is to be maintained. The coiled portion of cable 77 and the elastic 78 are stored in a compartment defined by the battery 61 and retainer 84 secured to the main body 11.

Considering now FIG. 1 together with FIG. 6, the hydrophone cable 77 is stored in a cannister 86 which abuts the leaf spring 67 and is urged downward thereby. The leaf spring 67 is illustrated in FIG. 6 by phantom representation to show the orientation thereof with respect to the cannister 86. The cable 77 is preferably elliptical in cross-section to facilitate optimum cable length in a given space. The cable is coated with an adhering compound and is wound in even layers into an annular configuration. The wound cable 77 is preferably potted with a plastic on the outer circumference to afford a close fit in the cannister 86. The end of the cable 77 appearing at the outer layer of the annular configuration in the cannister 86, is electrically connected to a potted hydrophone amplifier 87 in the detecting head 83. The other end of the cable 77 appearing at the inner layer of the annular configuration in the cannister 86 is electrically connected through the compliance arrangement to the network 33. The weight of the nose assembly 12, when disconnected from the main body 11, will cause the adhering compound to yield in such a manner as to progressively dispense or pay the cable 77 out of an aperture 90 in the cannister 86 and thereby gradually lower the nose assembly 12 to a desired depth.

FIG. 6 shows the detail structure of a depth selector designated generally by the numeral 85 comprising a pin 88 articulated about a pivot 89 which in turn is fixed to the cannister 86. As illustrated in FIG. 6, pin 88 is biased in a clockwise direction by a wire spring 91. A retaining spring 92 acting on the pin 88 opposes the force of the spring 91 to hold the pin 88 in a cable loop 93 which protrudes through an access hole 94. The loop 93 can be tied at any point along the length of the cable 77 and accordingly will determine the depth to which the nose assembly 12 will descend when the pin 88 is in the position shown. An aperture 96 in the casing 16 permits a prong, not shown, to be manually inserted into the depth selector 85 and disengage the spring 92 from the pin 88, thus allowing the pin 88 to rotate out of the loop 94. In a "pin-out" position, the cable 77 will be dispensed from the cannister 86 to the maximum effective length of the cable 77. A notch 97 receives the prong for manually resetting the pin 88 in the loop 94. In a "pin-in" position, the cable 77 will be dispensed out of the cannister 86 to a selected effective length as determined by the location of the loop along the cable. A cover guard 98 is secured to the cannister 86 for protecting the depth selector 85 as the cable 77 pays out through the aperture 90. It is further contemplated that the pin 88 can be remotely tripped out of loop 94 by electrical means such as a heating resistor actuating a bimetallic latch or by electrically releasing a tensioned spring held by a fusible link.

The detecting head 83 is fixed to the cannister 86 and is comprised of an omnidirectional hydrophone 99 integrally connected to the hydrophone amplifier 87. The hydrophone output is connected directly to the hydrophone amplifier input thereby avoiding low-level noise disturbances usually present when a hydrophone element is connected to an audio amplifier through long conductors. Furthermore, hydrophone and amplifier impedance matching can be readily determined and fixed without regard to the various cable lengths which may be used later for operation. A sensitive surface 101 of the hydrophone 99 is seated in a weight 102 forming the forward portion of the nose assembly 12 and having a ballistic frontal configuration. The profile of the weight 102 further defines a tapered portion 103 for seating in a corresponding profile of the forward end of casing 16. The force exerted by the leaf spring 67 is transferred through the cannister 86 and the detecting head 83 to the weight 102 to maintain positive contact with the casing 16 during normal handling of the assembled sonobuoy. The weight 102 is attached to the detecting head 83 by flexible hangers 104. Hence, sufficient tension is maintained on the cable 77 during cable payout from cannister 86, complete extension being thus assured; and the hydrophone 99 becomes fully exposed to the surrounding water at the sensitive surface 101 while the weight 102 remains attached.

An alternative embodiment of the sonobuoy is illustrated by the nose assembly 12' in FIG. 7. A casing 16' provides a forward section for seating a weight 102' in a correspondingly profiled section 103'. Initial communication of the battery 61 to sea water is through holes 60'. A hydrophone cable 77' is stored in a cannister 86' and is fixed to a potted hydrophone amplifier 87'. The cable 77' is annularly wound in the cannister 86' in the same manner as in the embodiment for an omnidirectional hydrophone hereinabove described. The cable 77' is payed out from the cannister 86' through an annular aperture 90'. A line-type hydrophone indicated generally by the numeral 99' is optimally responsive to sound sources normal to the ends of the hydrophone 99' when extended. A plurality of electro-acoustical elements 106 are stacked with the interconnecting conductors 107 wound around the circumference of the stack. The stack is held in a retainer clip indicated generally by the numeral 108 and is defined by a plurality of circumferentially disposed leaf springs 109 joined to each other at the bottom of the stack of elements 106 and extended upward about the wound conductors 107. The leaf springs 109 are biased radially inward against the conductors 107. The lower portion of clip 108 is further defined by studs 111 joined at the bottom of the clip 108 and projecting upward and disposed between adjacent leaf springs 109. The weight 102' is recessed for receiving the clip 108. The studs 111 snap under shoulder 112 to prevent the clip 108 from separating from the weight 102'. The bottom element 106' is connected to the weight 102' by a flexible hanger 104' to tension the line-type hydrophone 99' into a fully extended and substantially vertical position. The force exerted by the leaf spring 67 is transferred through the hydrophone amplifier 87' and the stack of elements 106 to the weight 102' thus maintaining positive contact with the casing 16' during normal handling of the assembled sonobuoy.

Figure 8:
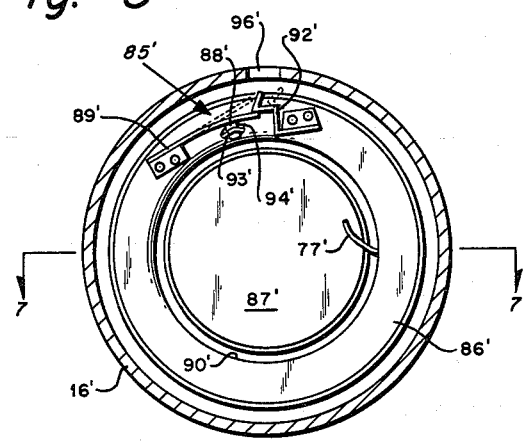
FIG. 8 represents in cross section a rear view of the alternative embodiment of the nose cone assembly taken on line 8—8 of FIG. 7.

FIG. 8 illustrates a depth selector indicated generally by the numeral 85' for the alternative embodiment shown in FIG. 7 and comprises a spring-biased pin 88' articulated about a fixed connection 89'. A retaining spring 92' holds the pin 88' in a cable loop 93' which protrudes through an access hole 94'. An aperture 96' in the casing 16' affords release or reset of the pin 88' in a manner described hereinabove with reference to the depth selector 85.

*Operation*

The operation of the sonobuoy can be best summarized by reference to the embodiment illustrated in FIG. 1 taken with the FIG. 9 where the sonobuoy has been fully conditioned to receive and transmit intelligence.

For a given type of underwater search or oceanographic survey, the desired listening depth will be preselected by means of the depth selector 85 for either of two effective cable lengths and then the sonobuoy is dispenser-loaded in an aircraft or other vehicle means. It should be noted that after the sonobuoys have been loaded in the aircraft, the preselection may be changed to the other of the two effective cable lengths by remote actuation in the manner hereinbefore stated. When the aircraft has reached the water area of interest, the sonobuoys are dispensed to obtain a prescribed dispersion pattern in the water.

As the completely assembled sonobuoy starts the descent in the air, air impact pressure against paddle 28 releases noose 27 from the blades 22 whereafter they are positioned by spring 26 to retard the speed of the sonobuoy to a low terminal velocity before entering the water. Upon entering the water, the nose assembly compartment is flooded by water entering through the holes 60 in the casing 16. The battery 61 is immediately activated upon immersion in the water and generates a voltage sufficient to ignite the squib-actuated devices 53 and 54, the time-delay fuse 44', and energize the electronic network 33. The device 53 releases the hoop spring 17 and jettisons the tail assembly 10 from the main body 11. Simultaneously, device 54 releases the hoop spring 18 and permits the nose assembly 12 to begin the descent in the water as the cable 77 is being progressively payed out from the cannister 86. Following the time-delay imposed by the fuse 44' for permitting the tail assembly 10 to clear itself of the main body 11, the squib 44 fires and forces the cartridge 39 over the prong 43. Pressurized gas in the cartridge 39 thus escapes into the folded flotation balloon 32 causing it to inflate and erect the antenna 47. Flotation of the main body 11 is maintained thereby at the enlarged section 52 of the balloon 32.

The weight of the nose assembly 12 causes the cannister 86 to continue paying out the cable 77 to the preselected effective hydrophone depth as determined by the position of pin 88 in the depth selector 85 at the time of the launching from the aircraft. Having reached this depth, as shown in FIG. 9, the weight 102 and casing 16 continue to descend until the hangers 104 stop further descent of the weight 102. The casing 16 will completely separate from the weight 102 and forms no further function in the operation of the sonobuoy. The sonobuoy is thus in condition to receive underwater sounds and transmit discrete radio signals indicative of said sounds.

Operation of the alternative embodiment shown in FIG. 7 differs only with respect to the manner of paying out the line-type hydrophone 99'. When the cable 77' reaches the preselected extended length, the weight 102', casing 16' and clip 108 continue downward progressively paying out the conductors 107 and the elements 106. Having dispensed the bottom element 106, the weight 102', clip 108 and casing 16' continue to descend until hanger 104' stops further descent of the weight 102' and the clip 108. Similarly, casing 16' will completely separate from the weight 102' and the clip 108 and form no further function in the operation of the sonobuoy.

It is further contemplated that an electrically responsive gas generator can be substituted for the compressed gas cartridge 39, for the purpose of inflating the balloon 32. There being no puncturing operation required by virtue of the generator being stationary with respect to the housing 36, the plunger 39, squib 44, and prong 43 are omitted. Furthermore, a separate battery may be connected to devices 53 and 54 and the fuse 44' thus obviating the need for the pin 58 and the switch 59.

It should be understood, of course, that the foregoing disclosure relates only to a preferred embodiment of the invention and that numerous modifications and variations may be made therein without departing from the spirit and scope of the invention as set forth in the appended claims.

What is claimed is:

1. An air-dropped miniature sonobuoy for acousto-electric transponding when immersed in water, comprising, in combination: a main body having a modulator-transmitter network mounted therein having input and output circuits therefor, an antenna having one end connected to said output circuit, a source of releasable compressed gas contained in said main body, an inflatable conical member connected at the base to said source for internal communication therewith, means connecting the other end of said antenna to the apex of said member, a sea-activated battery mounted in said main body, a first squib-actuated means mounted on said main body adjacent to said source for releasing said compressed gas, circuit means for connecting a time delay fuse between said first squib-actuated means and said battery, a nose assembly having a casing, a hydrophone and an amplifier therefor mounted in said casing and separable therefrom, a cable concomitantly connecting an output circuit of said amplifier to said input circuit and said battery to said amplifier, a cannister attached to said amplifier for storing said cable annularly wound for progressive dispensing, first releasable hoop means securing said casing forwardly of said main body, a tail assembly having an aerodynamic stabilizer and speed retarder, second releasable hoop means securing said tail assembly rearwardly of said main body, second and third squib-actuated means mounted on said main body retaining said first and second releasable hoop means in said securing position, and circuit means for connecting said battery to said second and third squib-actuated means whereby a voltage generated by said battery initiates release of said casing and said tail assembly simultaneously and inflation of said member a prescribed time thereafter.

2. An air-dropped miniature sonobuoy for acousto-electric transponding when immersed in water, comprising, in combination: a transmitting body having an antenna connected at one end to said body, an inflatable elongated member mounted on said body, a source of releasable compressed gas internally communicating with said inflatable elongated member and mounted on said body, means connecting the other end of said antenna to said member whereby said antenna is extended when said member is inflated, first squib-actuated means on said body for releasing said gas, a sea-activated battery mounted on said body, a time delay fuse connected between said first squib-actuated means and said battery; a casing, a detecting head separably mounted in said casing, a cable connecting said detecting head to said body, a cannister fixed to said detecting head for storing and progressively paying out said cable, first squib-releasable hoop means securing said casing forwardly of said body, an aerodynamically stable tail assembly, second squib-releasable hoop means securing said tail assembly rearwardly of said body, and circuit means connecting said battery to said first and second squib-releasable hoop means whereby a voltage generated by said battery initiates release of said casing and said tail assembly simultaneously and inflation of said member a prescribed time thereafter.

3. An air-dropped miniature sonobuoy for acousto-electric transponding when immersed in water, comprising, in combination: a transmitter mounted in a body, an antenna having one end connected to an output circuit of said transmitter, an elongated inflatable member mounted on said body, a releasable compressed gas supply mounted on said body and internally communicating with said inflatable member, means connecting the other end of said antenna to said member, means for releasing said gas, a sea-activated electric supply mounted on said body, delay means connected between said release means and said sea-activated electric supply, detecting means connected by a cable to said transmitter, means connected to said detecting means for storing and paying out said cable, first squib-actuated means for securing said detecting means forwardly of said transmitter body, a tail assembly, second squib-actuated means for securing said tail assembly rearwardly of said transmitter body, and circuit means connecting said electric supply to said first and second squib-actuated means whereby a voltage at said electric supply initiates release of said detecting means and said tail assembly simultaneously and inflation of said member a prescribed time thereafter.

4. An air-dropped miniature sonobuoy for acousto-electric transponding when immersed in water, comprising, in combination: a main body having a radio transmitter mounted therein, a tail assembly, a nose assembly having a casing, means separably connecting said main body at opposite ends to said tail assembly and said casing, a sea-activated battery mounted in said main body, first squib-actuated means in said main body electrically connected to said battery for separating said main body from said tail assembly and said casing, a weight seated in the extreme forward end of said casing and forming a ballistic frontal configuration, a hydrophone seated in the rearward face of said weight, a plurality of flexible hangers connecting said hydrophone to said weight, an amplifier fixed to said hydrophone, spring means attached to said main body urging said hydrophone and said weight into the seated position, cable means connected between said main body and said amplifier, an inflatable means attached to said main body, an antenna attached at one end to an outer extremity of the inflatable means and having the other end connected to said transmitter, said inflatable means being further defined by having an enlarged section located near the main body, second squib-actuated means contained in said main body for inflating said inflatable means, a time delay means connected between said second squib-actuated means and said battery, and switch means mounted on said main body for electrically isolating said first and second squib-actuated means from said battery after said second squib-actuated means is energized.

5. An air-dropped miniature sonobuoy for acousto-electric transponding when immersed in water, comprising, in combination: a casing of a nose assembly, a transmitter mounted in a body separably connected to said casing, a sea-activated battery in said body, first squib-actuated means on said body connected to said battery for separating said transmitter body from said casing, a weight seated in the extreme forward end of said casing and forming a ballistic frontal configuration, hanger means, a sound detecting head seated in the rearward face of said weight and connected thereto by said hanger means, cable means connected between said transmitter and said sound detecting head, an inflatable means attached to said transmitter body, an antenna attached at one end to an outer extremity of the inflatable means and having the other end connected to said transmitter, second squib-actuated means on said body operable to inflate said inflatable means, time delay means connecting said second squib-actuated means to said battery, and switch means connected between said first and second squib-actuated means and said battery for electrically isolating said first and second squib-actuated means from said battery after said second squib-actuated means is energized.

6. An air-dropped miniature sonobuoy for acousto-electric transponding when immersed in water, comprising, in combination: a casing of a nose assembly, a transmitter mounted in a body separably connected to said casing, first squib-actuated means on said body operable to release said transmitter body from said casing, a weight seated in said casing, hanger means, a detecting means seated in said weight and connected thereto by said hanger means, means connecting said transmitter to said detecting means, an inflatable means attached to said transmitter body, an antenna attached in said inflatable means and connected to said transmitter, and second squib-actuated means on said body operable to inflate said inflatable means.

7. In a sonobuoy having a buoyant main body and a submerged acoustic detector, a depth selector comprising: a cable adapted to be connected between the main body and the detector, a loop formed at a point intermediate of the ends of said cable, said cable being evenly wound into an annular reel with the loop exposed on the surface of said reel, a pin adapted to be pivotally supported in fixed relation to said detector and selectively inserted in said loop; whereby a portion of said cable will remain unwound when tension is applied between the ends of said cable.

8. A depth selector for use with a sonobuoy having a buoy and a submergible hydrophone, comprising: a cable having a loop formed therein and adapted to be connected between the buoy and the hydrophone, said cable being evenly wound into an annular configuration with the loop exposed at the surface of said configuration, container means adapted to be mounted on the hydrophone and containing said configuration, pin means pivotally supported on said container means and selectively inserted in said loop; whereby a portion of said cable will remain in said container means when tension is applied between the ends of said cable.

9. An air-dropped miniature sonobuoy for acousto-electric transponding when immersed in water, comprising, in combination: a casing of a nose assembly, a transmitter mounted in a body separably connected to said casing, a sea-activated battery, squib-actuated means on said body connected to said battery operable to separate said transmitter body from said casing, a weight seated in the extreme forward end of said casing and forming a ballistic frontal configuration, hanger means, a sound detecting head seated in the rearward face of said weight and connected thereto by said hanger means, cable means connected between said transmitter and said sound detecting head, an inflatable means attached to said transmitter body, an antenna attached at one end to an outer extremity of the inflatable means and having the other end connected to said transmitter, electrically released gas supply means on said body operable to inflate said inflatable means, and time delay means connecting said gas supply means to said battery.

References Cited in the file of this patent
UNITED STATES PATENTS

| | | |
|---|---|---|
| 1,639,810 | Pratt | Aug. 23, 1927 |
| 2,422,337 | Chilowsky | June 17, 1947 |
| 2,478,866 | Freas | Aug. 9, 1949 |
| 2,586,828 | Keeran | Feb. 26, 1952 |
| 2,629,083 | Mason et al. | Feb. 17, 1953 |
| 2,636,121 | Freas | Apr. 21, 1953 |
| 2,641,751 | Mason et al. | June 9, 1953 |
| 2,758,203 | Harris | Aug. 7, 1956 |
| 2,907,875 | Seyfang | Oct. 6, 1959 |
| 2,971,462 | Goff | Feb. 14, 1961 |